United States Patent [19]

Johnson

[11] 4,075,157
[45] Feb. 21, 1978

[54] PRODUCTION OF NON-CARCINOGENIC CARBON BLACK

[75] Inventor: Paul H. Johnson, Bartlesville, Okla.

[73] Assignee: Phillips Petroleum Company, Bartlesville, Okla.

[21] Appl. No.: 681,975

[22] Filed: Apr. 30, 1976

[51] Int. Cl.² .............................................. C08K 3/04
[52] U.S. Cl. .............................. 260/42.47; 260/42.48; 423/445; 423/450; 423/460
[58] Field of Search ............ 260/37, 40, 42.46, 42.47, 260/42.48; 423/450, 445, 455, 460

[56] References Cited

U.S. PATENT DOCUMENTS

| | | | |
|---|---|---|---|
| 2,707,673 | 5/1955 | Sweitzer et al. | 423/450 |
| 3,290,791 | 12/1966 | Keaton | 423/455 |
| 3,523,812 | 8/1970 | Kraus | 423/455 |
| 3,761,577 | 9/1973 | Dahmen et al. | 423/450 |
| 3,830,774 | 8/1974 | Jordan et al. | 260/42.46 |
| 3,887,690 | 6/1975 | West et al. | 423/456 |

Primary Examiner—Lewis T. Jacobs

[57] ABSTRACT

A non-carcinogenic normal cure carbon black is produced by severely aftertreating a carbon black-containing smoke to result in a carbon black with a photelometer of 100% and a pitting value of about 15 m²/g or more in case of small particle carbon black (CTAB of 120 m²/g) and of 0.2 m²/g or more in case of large particle carbon black (CTAB of 30 m²/g) by contacting the carbon black with an oxidizing agent, by high temperature drying the carbon black at a temperature of about 500 to about 600° F and finally by aftertreating the dried carbon black at a high temperature of about 1,000 to 1,400° F.

7 Claims, No Drawings

PRODUCTION OF NON-CARCINOGENIC CARBON BLACK

This invention relates to carbon black. More specifically this invention relates to non-carcinogenic carbon blacks that result in normal curing compositions when incorporated into curable rubber mixtures. In one of its aspects, this invention relates to the production of a non-carcinogenic carbon black. Yet another aspect of this invention relates to a rubber mixture containing such a non-carcinogenic carbon black.

BACKGROUND OF THE INVENTION

It is known that carbon black can be produced by pyrolytic decomposition of various hydrocarbon feedstocks. The widest use for such carbon blacks is in tires as a reinforcing agent for rubber. The eventual content of very small quantities of carcinogenic materials in the carbon black in these applications does not constitute a problem.

However, if carbon black is to be used either as a food ingredient or only in applications where the material in which it is incorporated gets in contact with food such as in wrapping materials, or rubber hoses or tubes in through which food materials or ingredients intended for human comsumption such as milk are flowing, the product is subject to rigid controls and has to pass certain tests before its use in these applications is approved. One of the problems is that extremely small but still detectible quantities of condensed polynuclear aromatics can be present in certain carbon blacks. Benzo (a) pyrene is an example of a known carcinogenic material among the many condensed aromatic ring structures. It would be desirable to have a process available by which a carbon black beng essentially free of such carcinogenics can be produced. It would be particularly desirable to have a process available by which a non-carcinogenic carbon black is produced which is normal, i.e., not slow curing.

THE INVENTION

It is thus one object of this invention to provide a non-carcinogenic carbon black.

Another object of this invention is to provide a non-carcinogenic carbon black that is normal curing when incorporated in rubber composition mixtures.

A further object of this invention is to provide a process for the production of such a non-carcinogenic carbon black.

Yet another object of this invention is to provide a rubber composition comprising a non-carcinogenic, normal cure carbon black.

Still a further object of this invention is to provide articles of manufacture made from a rubber composition containing a non-carcinogenic carbon black that is normal curing.

These and other objects, advantages, details, features and embodiments of this invention will become apparent to those skilled in the art from the following detailed description of the invention, the appended claims and the examples.

In accordance with this invention, I have now found that a noncarcinogenic normal curing black can be produced by pyrolytically decomposing in a carbon black furnace a hydrocarbon feedstock having a low carbon residue, severely aftertreating the carbon black in four steps.

The first step is a severe aftertreatment of the carbon blackcontaining smoke. The second step is oxidizing the black. The third step is drying wet carbon black pellets at a temperature of 500°–600° F. The fourth step is heating the dry carbon black pellets to a temperature of about 1,000 to 1,400° F.

The severe aftertreating of the carbon black-containing smoke results in a carbon black having a photolometer of about 100% and a pitting value of 15 $m^2/g$ or more for small particle carbon black and of 0.2 $m^2/g$ or more for large particle carbon black, said pitting value being defined as a difference between the nitrogen surface area in square meters per gram and the CTAB surface area in square meters per gram. More specifically the pitting value as defined is 0.2 $m^2/g$ or more for carbon blacks of 30 $m^2/g$ CTAB SA, is 7 $m^2/g$ or more for carbon blacks of 80 $m^2/g$ CTAB SA, and is 15 $m^2/g$ or more for carbon blacks of 120 $m^2/g$ CTAB SA; for carbon blacks with other particle sizes (other CTAB surface areas) the minimal pitting value can be readily calculated by interpolation from these values. Following the smoke aftertreatment, the carbon black is separated from the smoke and oxidized and pelleted with an aqueous pelleting agent. The wet carbon black pellets are dried at a temperature of about 500° to 600° F and thereafter the dried carbon black pellets are heat treated at a temperature of about 1,000° to about 1,400° F.

It has been found that the four steps of relatively severe treating of the black, namely the aftertreating of the carbon black-containing smoke, the oxidation, the high temperature drying, and finally the high temperature treatment of the dried carbon black results in a carbon black that is both non-carcinogenic and normal curing. The term "normal curing" or "slow curing" in connection with a carbon black refers as usually to the property of the carbon black when incorporated into a rubber composition. Thus a slow curing carbon black is a carbon black which when admixed to the rubber, together with a curing agent, needs a longer curing time or a higher curing temperature whereas a normal curing black when incorporated into the same rubber composition, together with the same curing agent, needs only shorter time or a lower temperature to effect the same degree of curing.

It is important to note that in the process of this invention the oxidizing step first results in a carbon black that is slow curing.. This oxidizing step, however, is important to render the carbon black non-carcinogenic. The final severe heat treatment as has been found in accordance with this invention then converts the carbon black into a normal curing carbon black while maintaining the important property of the carbon black of being non-carcinogenic.

In the definitions given above, the nitrogen surface area is determined in accordance with ASTM D-3037-71-T. The CTAB surface area is measured as described in J. Janzen and G. Kraus, Rubber Chemistry and Technology, 44, 1287 (1971). The photolometer, finally, is determined by the standard procedure ASTM D-1618-58-T.

The carbon black made in accordance with the process of the present invention contains less than about 0.05 wt. % of benzene extractibles. This weight percentage is based on the dry carbon black as 100%.

The carbon black in accordance with this invention can be produced from any kind of low carbon residue feedstock. The carbon residue content of the feedstock is determined by adding normal pentane to a sample of the feedstock, filtering the mass, drying the residue and weighing the residue. The feedstock to be used preferably contains less than 0.2 wt. % of carbon residue based on the carbon black. Among the various feedstocks, the highly aromatic feedstocks have the best overall results in the process. Particularly preferred feedstocks are solvent extracted distillates from catalytic cracking of gas oils or residue oils.. Especially useful and therefore preferred are $SO_2$ extract oils, toluene and mixtures thereof. An $SO_2$ extract oil is a cracked oil being liquid/-liquid extracted using liquid $SO_2$ to concentrate the aromatics in this oil.

The heat necessary for the pyrolytic decomposition of the feedstock can be generated by various means well known in the art. It is presently preferred to combust a fuel with air such as to produce hot combustion gases and to mix these hot combustion gases with the feedstock. Instead of this procedure or in addition thereto, a portion of the feedstock may be combusted to produce hot combustion gases. The oxidant used for the combustion of the fuel or of the combustion of a portion of the feedstock is generally and preferably air or oxygen or oxygen-enriched air.

Some materials can be added to the reaction mixture in the furnace in order to achieve certain special results, as long as these additives do not adversely interfere with the use of the carbon black produced in contact with food. Thus, small quantities of up to 20 ppm of potassium can be added to the feedstock, e.g., in the form of potassium chloride to reduce the structure. Preferably, however, no potassium is added.

In case a small particle carbon black is to be produced in accordance with this invention, this can be done in any of the well known reactors that are used for the production of small particle carbon black. Preferably the carbon black is produced in a so-called O-type carbon black reactor such as the one disclosed in the U.S. Pat. No. 2,541,700. If large particle carbon blacks, namely those carbon blacks having a surface area (CTAB surface area) of less than 80 m$^2$/g are to be produced also, known reactors can be used. Preferably these large particle carbon blacks are produced in a so-called A-type carbon black reactor such as the one disclosed in U.S. Pat. No. 2,375,795.

From the carbon black-containing smoke leaving the reactor after the severe aftertreatment, the carbon black is removed. This is done by well-known techniques. Most preferably the smoke is passed through elongated filter bags of glass fiber or polytetrafluoroethylene fiber material which are periodically emptied to recover the accumulated flocculent carbon black. This flocculent carbon black then is wet pelleted and dried. The wet pelleting is done by introducing the flocculent carbon black and an aqueous pelleting agent into a pelleter in which a pinned shaft is rotated. The wet carbon black pellets are finally dried at a temperature in the range of about 500° to 600° F. The pelleting liquid preferably contains an oxidizing agent such as hydrogen peroxide or $HNO_3$.

It is important for this invention to subject the carbon black to four special treatments. The first treatment is a severe aftertreatment of the carbon black-containing smoke to result in a photoelometer of the carbon black of 100% and a pitting degree (nitrogen surface area minus CTAB surface area) of 15 $^2$/g or more for the small particle carbon black and 0.2 m$^2$/g or more for the large particle carbon black. This severe aftertreatment is achieved either by a late quench or by a secondary air injection, or by both treatments combined. Quench, as is well known in the art, is the contacting of the carbon black containing hot smoke with a cooling agent such as water or cooked smoke to stop the carbon black from further physical and chemical changes. Late quench herein refers to the deferral of such a quenching step to a location further downstream than the location of normal quenching in order to achieve the 100% photolometer and the high pitting degree as defined by the minimum value for the difference between nitrogen surface area and CTAB surface area as defined above. Another possible severe aftertreatment is the injection of secondary air into the reactor downstream of the main carbon black forming zone and upstream of a quench zone. This secondary air injection or afterburning has the same effect as the late quench. Both procedures can be used combined.

The second treatment of the carbon black is an oxidation step. This step as such is also known in the art. Any of the known oxidation procedures can be employed. Preferably the water-soluble oxident such as hydrogen peroxide or nitric acid — the latter being preferred — is dissolved in the pelleting liquid. Thus the oxidation occurs after the pelleting and essentially during the final phase of the drying step. Thus the second and third treatments actually in this embodiment are carried out simultaneously. The preferred method of causing the oxidation of the black is to use an aqueous $HNO_3$ as the pelleting liquid. The quantity of $HNO_3$ present in the pelleting mixture is generally 2-10 wt. % $HNO_3$ based on the weight of carbon black as 100%.

The third treatment of the carbon black is a relatively severe drying step. The carbon black is wet pelleted utilizing any of the known aqueous pelleting liquids. The wet pellets then are dried so that their temperature is raised at least at the end of the drying zone to a value of about 500° to 600° F, preferably about 500° to 550° F.

The fourth severe treatment in accordance with this invention is a heating step in which the dried carbon black is heated in the absence of free oxygen, preferably in the presence of a protecting or blanketing gas which is an inert gas, such as carbon dioxide or nitrogen. This heating can be done in a rotating drum. The duration of this heating step depends upon the temperature used and generally the heating step will be shorter at higher temperatures. This heating of the dried and oxidized carbon black makes this carbon black a normal cure black. Without this heat treatment, the carbon black produced would be a slow cure carbon black.

In accordance with a further embodiment of this invention, there is provided a rubber composition containing carbon black. This rubber composition consists essentially of 100 parts by weight of a natural and/or synthetic rubber and 1 to 200 parts by weight of the carbon black defined above. Preferably still the rubber composition contains 20 to 80 parts by weight of the carbon black made in accordance with the processes defined above per 100 parts by weight of rubber. Examples for the synthetic rubber that can be used in these compositions of this invention are polymers of acyclic conjugated alkadienes, as well as copolymers of such acyclic conjugated alkadienes with monovinyl-substituted arenes. Particularly preferred are polymers made from butadiene, isoprene and/or piperylene as such or in combination and copolymerized with styrene. Mixtures of rubbers can be used.

Yet a further embodiment of this invention resides in a pipe that can be used for transporting materials intended for human consumption. This pipe consists essentially of a cured or non-cured rubber composition as defined above. Preferably this pipe has an outside diameter in the range of ¼ to 12 inches, whereas the wall thickness of this pipe is within the range of one-sixteenth to three-fourth inch. Such a pipe or hose combines the advantages of absorbing any light that might cause deterioration of the materials flowing through this pipe, while at the same time the carbon black contained in this pipe is non-carcinogenic. It is particularly advantageous that the carbon black made in accordance with this invention is non-carcinogenic but still is a normal curing carbon black so that rubber compositions containing this carbon black can be readily formed into pipes and cured within a reasonable period of time.

The invention will still be more fully understood from the following examples which are intended to show preferred embodiments of this invention but not to limit the scope thereof.

EXAMPLE I

In a reactor as described in the U.S. Pat. No. 2,564,700, a carbon black was produced. The reactor had the following dimensions:

| | |
|---|---|
| Diameter of the precombustion chamber (pcc): | 37 inches; |
| Axial length of the precombustion chamber: | 12 inches; |
| Diameter of the reaction section: | 15 inches, w/10 inch diameter choke of about 15 in. axial length at reactor inlet; |
| Axial length of the reaction section from downstream end of pcc to the quench: | 15¼ feet. |

Into this reactor the ingredients shown in the following tabulation under the conditions shown in the following tabulation were introduced. The properties of the carbon black obtained are also shown in the following tabulation.

TABLE

| | | |
|---|---|---|
| Oil: | | |
| | $SO_2$ extract oil, (BMCI of 92, mid boiling point 680° F, preheated to 390° F), gallons per hour | 240 |
| Air: | | |
| | Tangential, Standard Cubic Feet per hour (SCF/H), (preheated to 530° F) | 200,000 |
| Fuel Gas: | | |
| | Natural gas, Tangential, SCF/H | 14,300 |
| Air/Oil, | SCF/Gal | 833 |
| Air/Gas, | Vol. Ratio | 14 |
| Potassium | added as KCl, ppm K+ (based on carbon black) | 12 |
| Pelleting Solution, | aqueous $HNO_3$ (50/50 weight ratio of carbon black and pelleting solution in pelleter), wt. % $HNO_3$ | 3 |
| Dryer, | ° F (at the outlet end of dryer) | 500–550 |
| Carbon black properties: | | |
| | $N_2SA$, m²/gm | 142 |
| | CTAB, m²/gm | 113 |
| | ($N_2SA$-CTAB) m²/gm | 29 |
| | DBP, cc/100 gm[1] | 84 |
| | 24M4, cc/100 gm[2] | 80 |
| | Photolometer | 100 |
| | DPG[3] | 25 |
| | pH[4] | 5.5 |

[1]ASTM D-2414-70;
[2]U.S. Pat. 3,548,454, as measured after crushing, by Method b, ASTM 2414-70;
[3]Number of microequivalents of diphenylguanidine (DPG) absorbed by 1 gram of black, determined by back-titration of the benzene solution of DPG with standard methanolic HCl using tetrabromophenylsulfon phthalein indicator;
[4]ASTM D-1512.

This thus produced carbon black having been severely aftertreated by the quench being 15¼ feet downstream from the precombustion chamber, oxidized by the nitric acid treatment and subjected to a relatively high dryer temperature of 500°–550° F, was analyzed for the content of benzene extractibles, the content of benzo (a) pyrene, as well as for other polynuclear aromatic compounds. The results of this analysis are shown in the following table:

TABLE II

| Carbon black purity (quantities in ppm by weight based on carbon black unless otherwise indicated). | |
|---|---|
| Ingredients: | ppm by wt. on carbon black |
| Benzo (a) pyrene | nil |
| Naphthalene | nil |
| Acenphthylene | nil |
| Phenanthrene | nil |
| Anthracene | nil |
| Methylfuorene | nil |
| Dimethylbiphenyl | nil |
| Fluoranthene | <0.1 |
| Pyrene | <0.1 |
| Benzfluoranthene | nil |
| Chrysene | nil |
| Benzo (e) pyrene | nil |
| Total benzene extractibles, ppm | 36 |

The lower limit of detectability of the various ingredients is about 0.05 ppm.

Also determined as not present in this carbon black are: biphenyl, acenaphthene, fluorene, dimethylbiphenyl, methylenephenanthrene, benzofluorene, cyclopenta (c,d) pyrene, 3,4-benzophenanthrene, triphenylene, tetraphene, naphthanthracene, tetracene, ethylfluoranthrene, terphenyl, 2-methyl-3,4-benzophenanthracene, binaphthyl, (7,12-dimethyl) benz (a) anthracene, anthanthrene, benzo (ghi) perylene, indene (1,2,3-cd) pyrene, and dibenz (a,h) anthracene.

EXAMPLE II

A black similar to the one produced in accordance with Example I had the following properties:

| | |
|---|---|
| $N_2SA$, m²/g | 145 |
| CTAB, m²/g | 122 |
| 24M4 DBP, cc/100 g | 99 |
| DPG | 44 |

This black was sampled and subjected to heat treatments of varying severity as shown in the following table. The DPG of the black was determined. The DPG is a property that is measured as milliequivalents of diphenylguanidine (DPG) absorbed by 1 gram of black, determined by back-titration of the benzene solution of DPG with standard methanolic HCl, using tetrabromophenylsulfonephthalein as indicator. The DPG is a measurement for the volatile matter content of the carbon black. The following results were obtained by this measurement:

TABLE

| Treating Temp., ° F | 400–500 | 700 | 1,000 | 1,300 |
|---|---|---|---|---|
| 15 min., DPG | — | 43.5 | 33.3 | 18.9 |

TABLE-continued

| Treating Temp., °F | 400–500 | 700 | 1,000 | 1,300 |
|---|---|---|---|---|
| 30 min., DPG | 44 | 40.3 | 29.4 | 13.5 |

The results of this table show that the high temperature treatment of the carbon black that has been made under a carbon dioxide blanket gas results in a considerable reduction in the DPG value. In other words the high temperature treatment at the end of the process changes the carbon black produced from a slow curing carbon black to a normal curing carbon black.

Reasonable variations and modifications which will become apparent to those skilled in the art can be made in the present invention without departing from the spirit and scope thereof.

I claim:

1. A process for the production of a non-carcinogenic normal curing carbon black which comprises
   a. pyrolytically in a carbon black furnace decomposing a hydrocarbon feedstock having a low carbon residue of less than about 0.2 weight % such as to form smoke containing carbon black,
   b. severely aftertreating said smoke by subjecting it to at least one of the steps of late quenching and secondary air injection to produce a smoke containing a carbon black of about 100% photelometer and a pitting value of about 15 m$^2$/g or more, in the case of a small particle carbon black having a CTAB surface of 120 m$^2$/g, of 7 m$^2$/g or more for the carbon black having a CTAB surface area of 80 m$^2$/g or more, and of 0.2 m$^2$/g or more in the case of a large particle carbon black having a CTAB surface of 30 m$^2$/g, said pitting value defined as the difference between the nitrogen surface area and the CTAB surface area, both in square meters per gram,
   c. separating said carbon black from said carbon black-containing smoke,
   d. oxidizing said carbon black and pelleting the carbon black with an aqueous pelleting agent,
   e. drying the wet carbon black pellets at a temperature of about 500° to 600° F,
   f. heat treating the dried carbon black pellets at a temperature in the range of about 1000° to 1400° F and thereafter
   recovering the dried carbon black pellets as the product of the process.

2. A process in accordance with claim 1 wherein said feedstock is selected from the group consisting of toluene and SO$_2$ extract oil.

3. A process in accordance with claim 1 wherein said carbon black is oxidized by contacting the carbon black with an aqueous solution of HNO$_3$ as the pelleting liquid so that the mixture contains about 2–10 wt. % of HNO$_3$ based on the weight of carbon black as 100%.

4. A process in accordance with claim 1 wherein said aftertreating of said carbon black-containing smoke is carried out by a late quench step and/or by the introduction of secondary air between the main carbon black forming reaction zone and a quench location.

5. A non-carcinogenic normal curing carbon black obtained by pyrolytically in a carbon black furnace decomposing a hydrocarbon feedstock having a carbon residue of less than about 0.2 weight per cent such as to form a smoke containing carbon black, severely aftertreating said smoke by subjecting it to at least one of the steps of late quenching and secondary air injection, separating said carbon black from said carbon black containing smoke, oxidizing said carbon black and pelleting said carbon black with an aqueous pelleting agent, drying the wet carbon black pellets at a temperature of about 500° to 600° F., heating the dried carbon black pellets at a temperature in the range of about 1000° to 1400° F., the thus obtained carbon black being further characterized by having
   a photelometer of 100 percent
   a pitting degree of about 15 m$^2$/g or more in the case of a small particle carbon black having a CTAB surface of 120 m$^2$/g, a pitting degree of 7 m$^2$/g or more for a carbon black having a CTAB surface area of 80 m$^2$/g and a pitting degree of 0.2 m$^2$/g or more in the case of a large particle carbon black having a CTAB surface area of 30 m$^2$/g, the minimum pitting degree of a carbon black having other CTAB surface areas being obtained by interpolation, said pitting value being defined as the difference between the nitrogen surface area and the CTAB surface area, both in square meters per gram,
   and a content of benzene extractables of less than 0.05 weight percent.

6. A rubber composition consisting essentially of 100 parts by weight of a rubber selected from the group consisting of natural rubber and/or synthetic rubber and about 1 to about 200 parts by weight of a carbon black obtained by a process in accordance with claim 5.

7. A rubber composition in accordance with claim 6 containing about 20 to about 80 parts by weight of said carbon black.

* * * * *